US008590129B2

(12) United States Patent
Garces

(10) Patent No.: US 8,590,129 B2
(45) Date of Patent: Nov. 26, 2013

(54) TEMPORARY BEVELED CLAMPING SURFACE CASING ALIGNMENT TOOL (CAT)

(76) Inventor: Noel E. Garces, Rockport, TX (US)

( * ) Notice: Subject to any disclaimer, the term of this patent is extended or adjusted under 35 U.S.C. 154(b) by 251 days.

(21) Appl. No.: 13/161,803

(22) Filed: Jun. 16, 2011

(65) Prior Publication Data

US 2012/0317785 A1 Dec. 20, 2012

(51) Int. Cl.
*B23P 19/04* (2006.01)

(52) U.S. Cl.
USPC .................................. 29/255; 29/270; 29/278

(58) Field of Classification Search
USPC ............ 29/272, 278, 244, 255, 238, 239, 270
See application file for complete search history.

(56) References Cited

U.S. PATENT DOCUMENTS

| | | | | |
|---|---|---|---|---|
| 4,373,235 | A * | 2/1983 | Korgaonkar | 24/285 |
| 6,412,160 | B1 * | 7/2002 | Glessner et al. | 29/423 |
| 6,550,119 | B2 * | 4/2003 | Ishida et al. | 29/237 |
| 7,625,017 | B1 * | 12/2009 | Radzik | 285/415 |
| 8,342,483 | B1 * | 1/2013 | Manning | 254/134.3 R |
| 8,408,529 | B2 * | 4/2013 | Falk | 269/287 |
| 2012/0248767 | A1 * | 10/2012 | Lippka | 285/369 |
| 2012/0317785 | A1 * | 12/2012 | Garces | 29/466 |

* cited by examiner

*Primary Examiner* — Lee D Wilson

(57) ABSTRACT

An alignment tool affords a safe and economical way to install surface casing, eliminating the need to align or delay the installation in speedhead or multibowl well drilling applications. The alignment tool includes two split halves that may clamp onto an existing surface casing. A top plate of the alignment tool may overlay the top flat surface edge of the surface casing, eliminating the possibility of the surface casing coupling to strike the flat edge and obstructing passage. The top plate may include a beveled edge to further help align the surface casing into the conductor pipe.

7 Claims, 3 Drawing Sheets

TEMPORARY BEVELED CLAMPING SURFACE CASING ALIGNMENT TOOL (CAT)

BACKGROUND OF THE INVENTION

The present invention relates to alignment tools and, more particularly, to a surface casing alignment tool for oil and gas well speedhead or multibowl applications.

On most oil and gas wells, there is a speedhead or multi-bowl system used to land the surface casing. This method requires the removal of a riser used during the drilling phase of the surface hole to run the surface casing and install the wellhead. Removal of the riser creates a problem running the surface casing if not properly aligned. The flat edge on the conductor pipe causes the coupling on the casing to obstruct passage in the hole and delays the job.

During the passage through of the surface casing, the driller (rig operator) cannot visually see if the surface couplings hang up on the conductor pipe edge during passage into the well bore. Therefore, the driller has to slow down or even pickup if he hits the top edge. On some of the newer drilling rigs that are computerized, this causes the rig to physically shut down because the computer does not recognize the sudden weight loss and thinks it is an obstruction downhole in the well bore. This collision could also cause damage to the top edge of the conductor pipe.

As can be seen, there is a need for a tool to create a temporary clearance between a surface casing and a conductor pipe, even with improper alignment for the casing, thereby eliminating costly delays in installing the casing.

SUMMARY OF THE INVENTION

In one aspect of the present invention, a tool comprises a first casing half; a second casing half, having a hinge side hingedly attached to a hinge side of the first casing half; a tightening mechanism adapted to adjustably reduce an inside diameter between the first casing half and the second casing half; alignment plates attached to the first casing half and the second casing half, the alignment plates forming an alignment plate inside diameter smaller than the inside diameter of the casing halves, the alignment plate having an alignment plate outside diameter larger than an outside diameter of the casing halves.

In another aspect of the present invention, a method for deploying a surface casing inside a conductor pipe comprises placing an alignment tool about an end of the conductor pipe, the alignment tool having a first casing half being hingedly attached to a second casing half, the alignment tool having alignment plates disposed on top edges of the casing halves; resting a portion of the alignment plates onto an edge of the conductor pipe, the alignment plates having an alignment plate inside diameter smaller than an inside diameter of the casing halves; securing the alignment tool onto the conductor pipe by tightening a tightening mechanism to reduce an inside diameter of the casing halves; and passing surface casing through the alignment plates and into the conductor pipe.

These and other features, aspects and advantages of the present invention will become better understood with reference to the following drawings, description and claims.

DETAILED DESCRIPTION OF THE INVENTION

Figure 1:
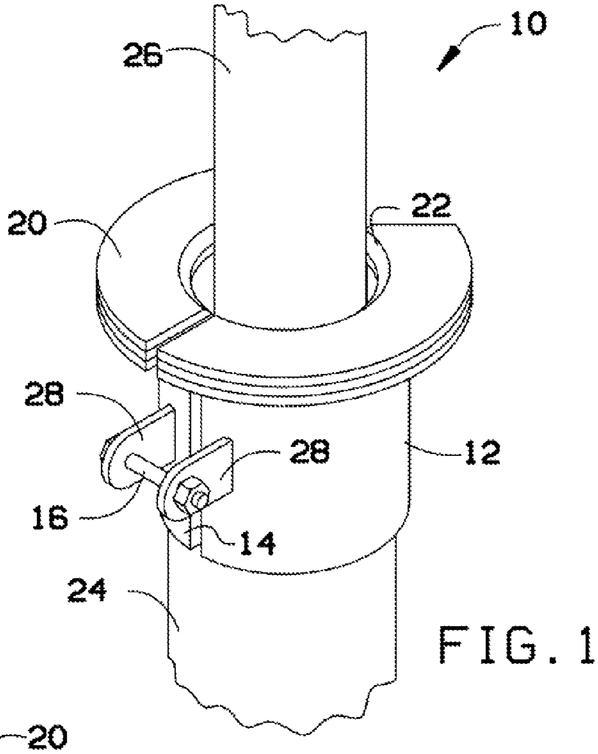
FIG. 1 is a perspective view of an alignment tool installed on a conductor pipe, according to an exemplary embodiment of the present invention.
Figure 2:
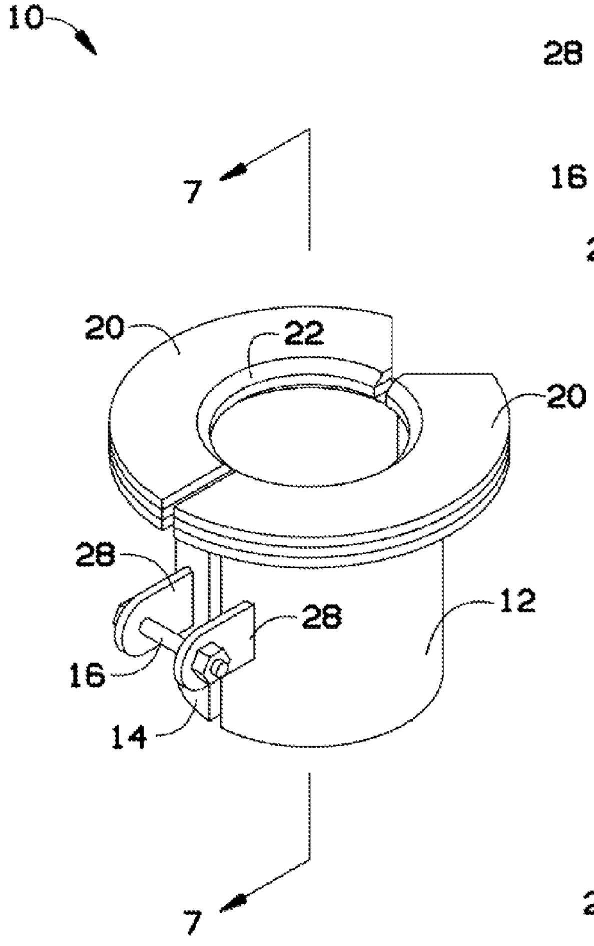
FIG. 2 is a securing-side perspective view of the alignment tool of FIG. 1.
Figure 3:
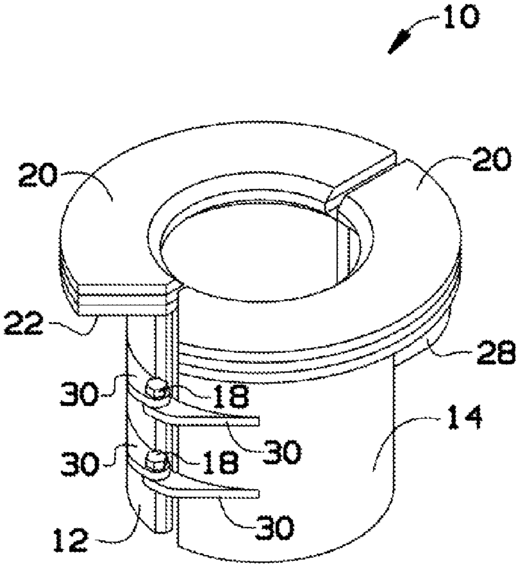
FIG. 3 is a hinge-side perspective view of the alignment tool of FIG. 1.
Figure 4:
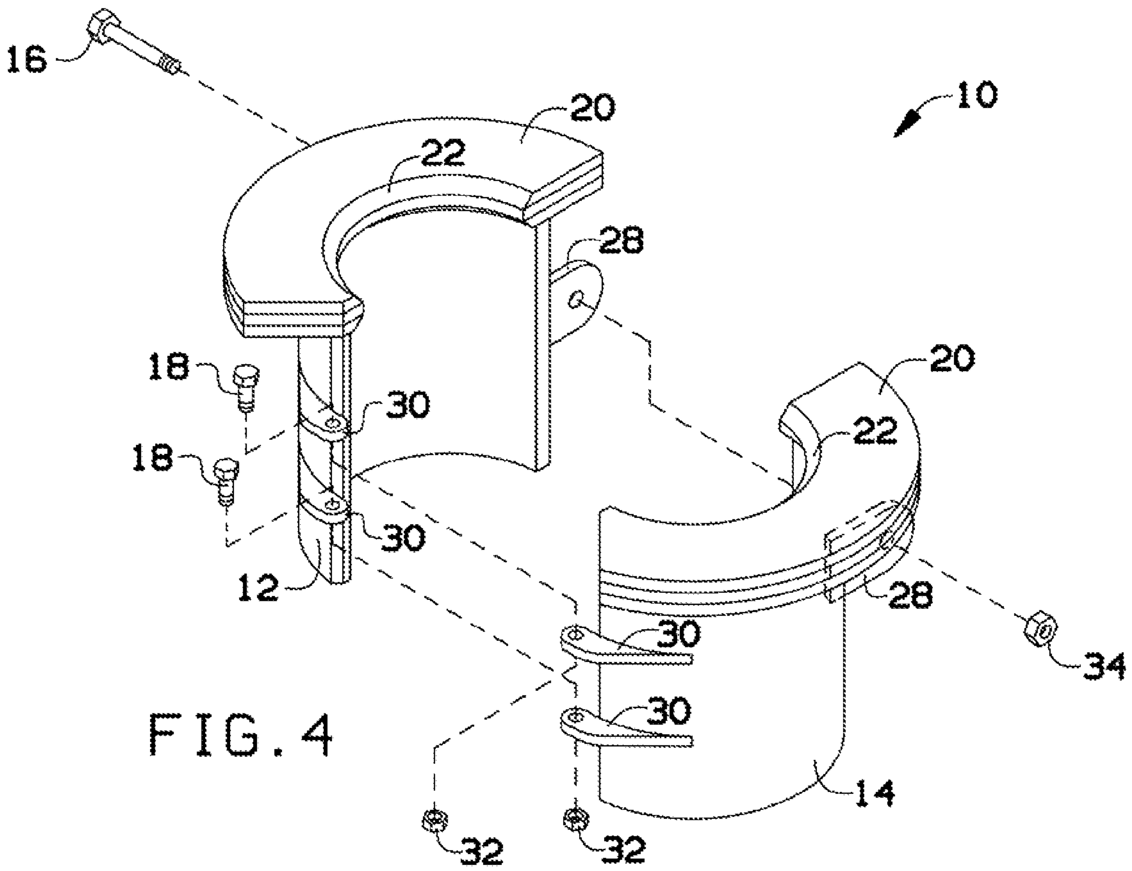
FIG. 4 is an exploded view of the alignment tool of FIG. 1.
Figure 5:
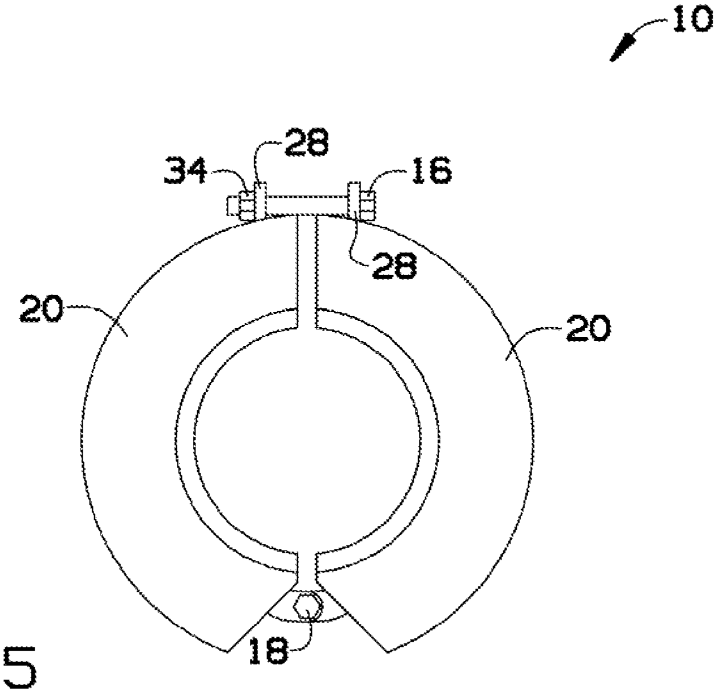
FIG. 5 is a top view of the alignment tool of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an alignment tool that affords a safe and economical way to install surface casing, eliminating the need to align or delay the installation in speedhead or multibowl well drilling applications. The alignment tool includes two split halves that may clamp onto an existing surface casing. A top plate of the alignment tool may overlay the top flat surface edge of the surface casing, eliminating the possibility of the surface casing coupling to strike the flat edge and obstructing passage. The top plate may include a beveled edge to further help align the surface casing into the conductor pipe.

Referring to FIGS. 1 through 7, an alignment tool 10 may include a first casing half 12 and a second casing half 14. The first casing half 12 may be hingedly attached to the second casing half 14. In some embodiments, one or more hinge plates 30, typically two hinge plates 30, may be formed on each casing half 12, 14. A hinge bolt 18 may pass through a hole in the hinge plate 30 on the first casing half 12 and a corresponding hole in the hinge plate 30 on the second casing half 14 to create a hinged connection between the casing halves 12, 14. A hinge nut 32 may secure the hinge bolt 18 in place.

On non-hinged ends of the casing halves 12, 14, pad eyes 28 may be disposed on each casing half 12, 14. The pad eyes 28 may each have a hole formed therein, permitting a securing bolt 14 to extend therethrough. Tightening of the securing bolt 14 on a securing nut 34 may cause the casing halves 12, 14 to move closer together, reducing the inside diameter of the alignment tool 10. Other tightening mechanisms may be used to permit the casing halves 12, 14 to adjustably move together.

An alignment plate 20 may be disposed on an edge of each of the casing halves 12, 14. The alignment plate 20 may be disposed perpendicularly on each casing half 12, 14, creating a 90 degree placement directly on top of each casing half 12, 14 but extending about ⅜ to ½ inch past the inside diameter of the casing halves 12, 14. The alignment plate 20 may be circular (when the alignment tool 10 is in a closed position), having a thickness from about 1 inch to about 2.0 inches. The alignment plate 20 may extend beyond the outer edge of the casing halves 12, 14 by about 4 inches, or more, for handling and durability. An inside top edge of the alignment plate 20 may have a bevel 22 at about 45 degrees to create a kickoff plate for the surface casing coupling (not shown) passage.

Figure 6:
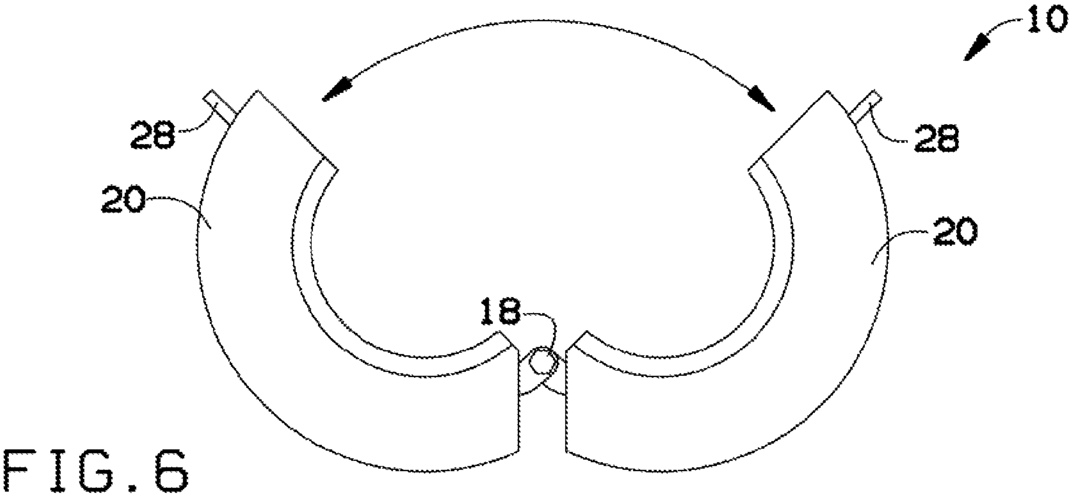
FIG. 6 is a top view of the alignment tool of FIG. 1 in an open position.
Figure 7:
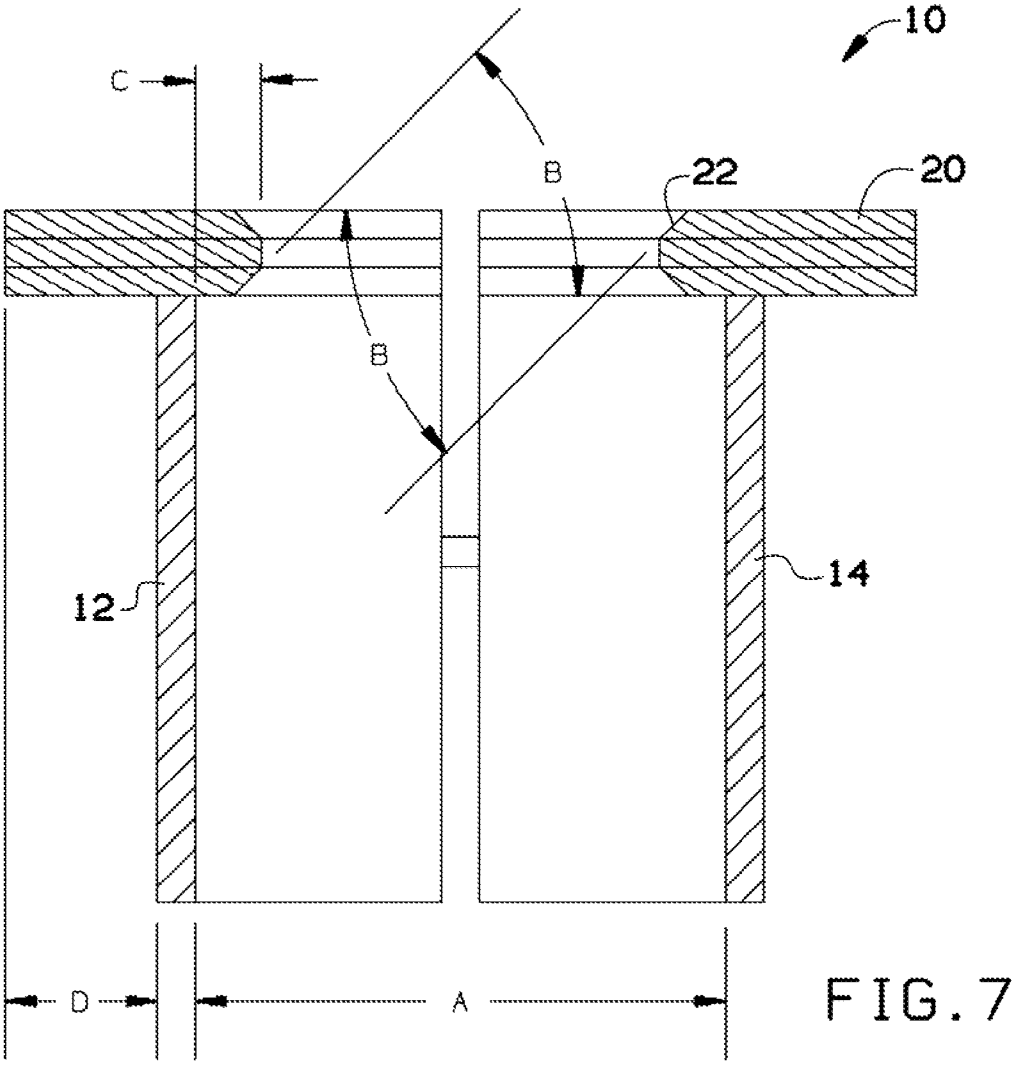
FIG. 7 is a cross-sectional view taken along ling 7-7 of FIG. 2.

The alignment tool 10 may be opened, as shown in FIG. 6, and may be attached around the end of a conductor pipe 24 as shown in FIG. 1. Tightening of the securing bolt 16 may temporarily, but securely, fix the alignment tool 10 on the conductor pipe 24. The alignment plate 20 may rest on the top edge (not shown) of the conductor pipe 24. The alignment tool 10 may permit entry and passage of a surface casing 26, including surface casing couplings, into and through the conductor pipe 24. The alignment tool 10 may reduce running time and may eliminate the safety hazard of having the surface casing couplings hanging up on the conductor pipe edge during passage into the well bore.

Most common conductor casings are of 14 inches or 16 inches outside diameter on speedhead applications and have surface casing installed with a typical outside diameter of 9⅝ inches, 10¾ inches or 13⅜ inches. The casing halves 12, 14 may be formed by cutting a section of conductor pipe in half, thereby creating casing halves 12, 14 with the same curvature of the conductor casing, permitting the casing halves 12, 14 to clamp on the conductor pipe 24. Depending on the size of the conductor pipe 24, different size alignment tools 10 may be designed.

It should be understood, of course, that the foregoing relates to exemplary embodiments of the invention and that modifications may be made without departing from the spirit and scope of the invention as set forth in the following claims.

What is claimed is:

1. A tool comprising:

a first casing half;

a second casing half, having a hinge side hingedly attached to a hinge side of the first casing half;

a tightening mechanism adapted to adjustably reduce an inside diameter between the first casing half and the second casing half; alignment plates attached to the first casing half and the second casing half, the alignment plates forming an alignment plate inside diameter smaller than the inside diameter of the casing halves, the alignment plate having an alignment plate outside diameter larger than an outside diameter of the casing halves wherein the alignment plate outside diameter is about 4 inches larger than the outside diameter of the casing halves.

2. The tool of claim 1, wherein the tightening mechanism includes pad eyes extending from sides opposite the hinge sides of the first casing half and the second casing half.

3. The tool of claim 2, further comprising a securing bolt adapted to extend through holes in the pad eyes and be secured by a securing nut.

4. The tool of claim 1, wherein the alignment plate inside diameter is from about ¾ to about 1.5 inches smaller than the inside diameter of the casing halves.

5. The tool of claim 1, wherein an upper inside surface of the alignment plates is beveled.

6. The tool of claim 5, wherein the bevel is about 45 degrees.

7. A tool comprising:

a first casing half;

a second casing half, having a hinge side hingedly attached to a hinge side of the first casing half;

a tightening mechanism adapted to adjustably reduce an inside diameter between the first casing half and the second casing half; alignment plates attached to the first casing half and the second casing half, the alignment plates forming an alignment plate inside diameter smaller than the inside diameter of the casing halves, the alignment plate having an alignment plate outside diameter larger than an outside diameter of the casing halves wherein the alignment plate further comprising a front surface being flat, a second surface having a portion with is flat and extending in 45 degrees for the flat portion, an inner diameter with a top surface at 45 degrees, a middle portion being flat and a bottom surface being at 45 degrees.

* * * * *